US012345543B2

(12) United States Patent
Messia et al.

(10) Patent No.: US 12,345,543 B2
(45) Date of Patent: Jul. 1, 2025

(54) PATROL MANAGEMENT SYSTEM

(71) Applicant: TRANSFINDER CORPORATION, Schenectady, NY (US)

(72) Inventors: Joseph Messia, Schenectady, NY (US); Antonio Civitella, Schenectady, NY (US)

(73) Assignee: Transfinder Corporation, Schenectady, NY (US)

( * ) Notice: Subject to any disclaimer, the term of this patent is extended or adjusted under 35 U.S.C. 154(b) by 267 days.

(21) Appl. No.: 18/048,976

(22) Filed: Oct. 24, 2022

(65) Prior Publication Data
US 2024/0133708 A1  Apr. 25, 2024
US 2024/0230363 A9  Jul. 11, 2024

(51) Int. Cl.
*G01C 21/00* (2006.01)
*G06Q 50/26* (2012.01)

(52) U.S. Cl.
CPC ......... *G01C 21/3811* (2020.08); *G06Q 50/26* (2013.01)

(58) Field of Classification Search
CPC .. G01C 21/3811; G06Q 50/26; G06Q 10/063; G06Q 10/06311; G06Q 50/265; G08G 1/13; G07B 15/02
USPC ........................................................ 701/450
See application file for complete search history.

(56) References Cited

U.S. PATENT DOCUMENTS

| | | | |
|---|---|---|---|
| 2005/0080636 A1* | 4/2005 | Markwitz ........ | G06Q 10/06311 702/187 |
| 2009/0256693 A1* | 10/2009 | Brinton ................. | G06Q 10/06 340/439 |
| 2017/0207949 A1 | 7/2017 | Donovan et al. | |
| 2018/0227713 A1 | 8/2018 | Frank et al. | |
| 2020/0053324 A1* | 2/2020 | Deyle .................... | G01C 21/20 |
| 2020/0126427 A1* | 4/2020 | Civitella ................ | G08G 1/127 |
| 2021/0272458 A1* | 9/2021 | Civitella ................ | G08G 1/123 |

OTHER PUBLICATIONS

International Search Report and Written Opinion issued in PCT/US2023/77544 and mailed Feb. 14, 2024.

* cited by examiner

*Primary Examiner* — Muhammad Shafi
(74) *Attorney, Agent, or Firm* — Nicholas Mesiti, Esq.; Heslin Rothenberg Farley & Mesiti P.C

(57) ABSTRACT

A method of managing patrols includes one or more processors receiving GPS data from multiple patrol mobile devices. The processors receive GPS data for the patrols and compare the same to GPS coordinates for patrol points. Patrol points are displayed on a digital map using patrol status visual indicators. The patrol status is based upon the length of time between the last patrol of the patrol point and the time remaining until its next scheduled patrol frequency time expires. The map is continuously automatically updated in real time to display the patrol status of each patrol point, for example, as patrolled or unpatrolled.

27 Claims, 10 Drawing Sheets

PATROL MANAGEMENT SYSTEM

FIELD OF THE INVENTION

This invention relates, in general, to patrols such as such as police or other law enforcement or governmental or organizational expeditions which keep watch over an area using mobile transportation or vehicles having or being monitored by mobile communication devices, and in particular, to a patrol management system.

BACKGROUND

Mobile devices include objects which are capable of movement such as vehicles (e.g., cars, trucks, buses, and trolleys) or mobile communication devices, including mobile cellular devices and wireless communication and computing devices. Mobile devices may be used to provide patrol services, such as police or other governmental organizations patrolling various geographic areas such as cities or portions or zones thereof. Selectively managing patrols including sharing patrol data can be a difficult task.

One challenge in patrol management includes patrolling voluminous locations within a geographic zone and keeping track of the numerous locations which have been patrolled during a particular period of time. Managing patrols including operating fleets of vehicles on patrol simultaneously and managing and sharing the status of locations subject to patrol is challenging. Also, it is a challenge to share real time information of patrols and locations subject to patrol selectively with mobile devices, and to maintain historical and real time information of multiple patrol objects, including individual vehicles, and to maintain historical and real time information of geographic patrol areas such as street segments within a city to determine when they have been patrolled and whether they should be patrolled.

Mobile objects include objects which are capable of movement such as vehicles or mobile devices, including cellular devices and wireless communication devices, and may include, but are not limited to phones, tablets, cars, buses, street sweepers, mail trucks, helicopters, bicycles, horses, and people. Mobile objects such as cars or bicycles may be used to provide services, such as patrolling a set of streets, a neighborhood or location within a city. Mobile objects used for patrolling may be required to cover specific streets, neighborhoods, or attention points within a set time period to ensure the patrolled region has been patrolled, for example, by the assigned officer or officers. It can be difficult for a mobile object with a mobile device to know if a particular street or region has been patrolled in the designated time period or when that street or region will require a new patrol. Additionally, supervisors may need to know the status of a patrolled street, neighborhood, or attention point to determine if a patrol needs to be dispatched or if the area has been covered by the wrong patrol. Patrol management may also require that specific patrols, e.g., officers, cover assigned geographic regions.

SUMMARY

Shortcomings of the prior art are overcome and additional advantages are provided through the provision of a method, system and/or computer program product for managing patrols including patrol locations ("patrol points"). The method includes recording, in a digital memory, GPS information relating to patrol points assigned to street segments of a geographic area; for the patrol points, recording in a digital memory, at least one patrol frequency time, wherein each patrol point is associated with at least one patrol frequency time; obtaining, via at least one processor, GPS location information relating to the location of at least one patrol; determining, via the at least one processor, when patrol points have been patrolled by comparing the GPS location information of the patrol points to the GPS location information of the at least one patrol; displaying, via a processor, the patrol points and streets on a map of the geographic zone via at least one display device; determining, via the at least one processor, a patrol status for patrol points based upon the determining when patrol points have been patrolled and time from a last prior patrol of the patrol points; displaying on the map visual indicators of the patrol status for patrol points; and automatically updating said map, via a processor, in real-time by changing the visual indicators for patrol points based upon their patrol status. A patrol frequency or patrol frequency time represents a period of time within which a location should be patrolled. For example, a patrol frequency may be every 24 hours.

The patrol status may represent patrol points which have been patrolled or unpatrolled, since their last patrol frequency time expired. The patrol status may be based upon the length of time between the last patrol of the patrol point and the time remaining until its next scheduled patrol frequency time expires. The patrol status may also represent patrol points which have not been patrolled prior to the time their latest earlier patrol frequency time expired and patrol points which have not been patrolled within at least a predetermined time prior to the next time their associated patrol frequency time will expire. The patrol statuses may also represent patrol points which have time remaining until their current patrol frequency time expires but have not been patrolled during the current patrol frequency time period. For example, the patrol status may represent patrol points which (i) have been patrolled prior to the time their latest earlier patrol frequency expired, (ii) have been unpatrolled within at least a first predetermined time prior to the next time their associated patrol frequency will expire, (iii) have been unpatrolled within at least a second predetermined time prior to the next time their associated patrol frequency will expire, and (iv) have not been patrolled prior to the time their latest earlier patrol frequency expired.

The patrol points on the map are automatically updated by a processor by changing patrolled visual indicators at patrol points which have not been patrolled during their associated patrol frequencies to unpatrolled visual indicators. The visual indicators for patrolled points are different based upon their patrol status and are displayed differently on the map. Optionally, the patrol frequencies are different for a portion of the patrol points. The patrol points may be associated with additional stored data. Points of interest (attention points) may also be recorded in the digital memory and displayed on the map. Each attention point is also associated with a patrol frequency and assigned patrol statuses. The processor may display patrolled visual indicators on the map for each attention point which has been patrolled during its associated patrol frequency. Visual indicators for each attention point are automatically updated in real time based upon if or when the attention point has been patrolled during its associated patrol frequency. Optionally, the processor may display the patrols including multiple patrols on the map in real time as the patrols are moving. The patrol status is configurable by changing times associated with displaying different visual indicators of the patrol status at the patrol points and/or attention points.

The method is implemented to perform automatically via a computer system, including having one or multiple processors which may or may not be decentralized, and mobile communication and/or computing devices. The patrol information may be shared to the users (e.g., the patrols), an administrator and/or other third parties.

The patrols may each include one or more mobile devices such as a mobile computing device and/or mobile communication device such as a smartphone. Each aforementioned step of the method is implemented to perform and occurs automatically via a computer system. Patrol data, such as the location, time and date of each patrol, as well as the location time and date of the patrol of each patrol point and attention point, and information relating to or based upon such data, may be stored in memory associated with the one or more processors. Also, information regarding the designation of mobile devices which may share the information may also be stored in such memory. The memory may be a single storage device or multiple storage devices which may or may not be decentralized.

The computer program product includes a computer readable storage medium readable by a processing circuit and storing instructions for performing the method, for example, as described above and herein. Also, computer-implemented systems relating to one or more aspects of the method are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
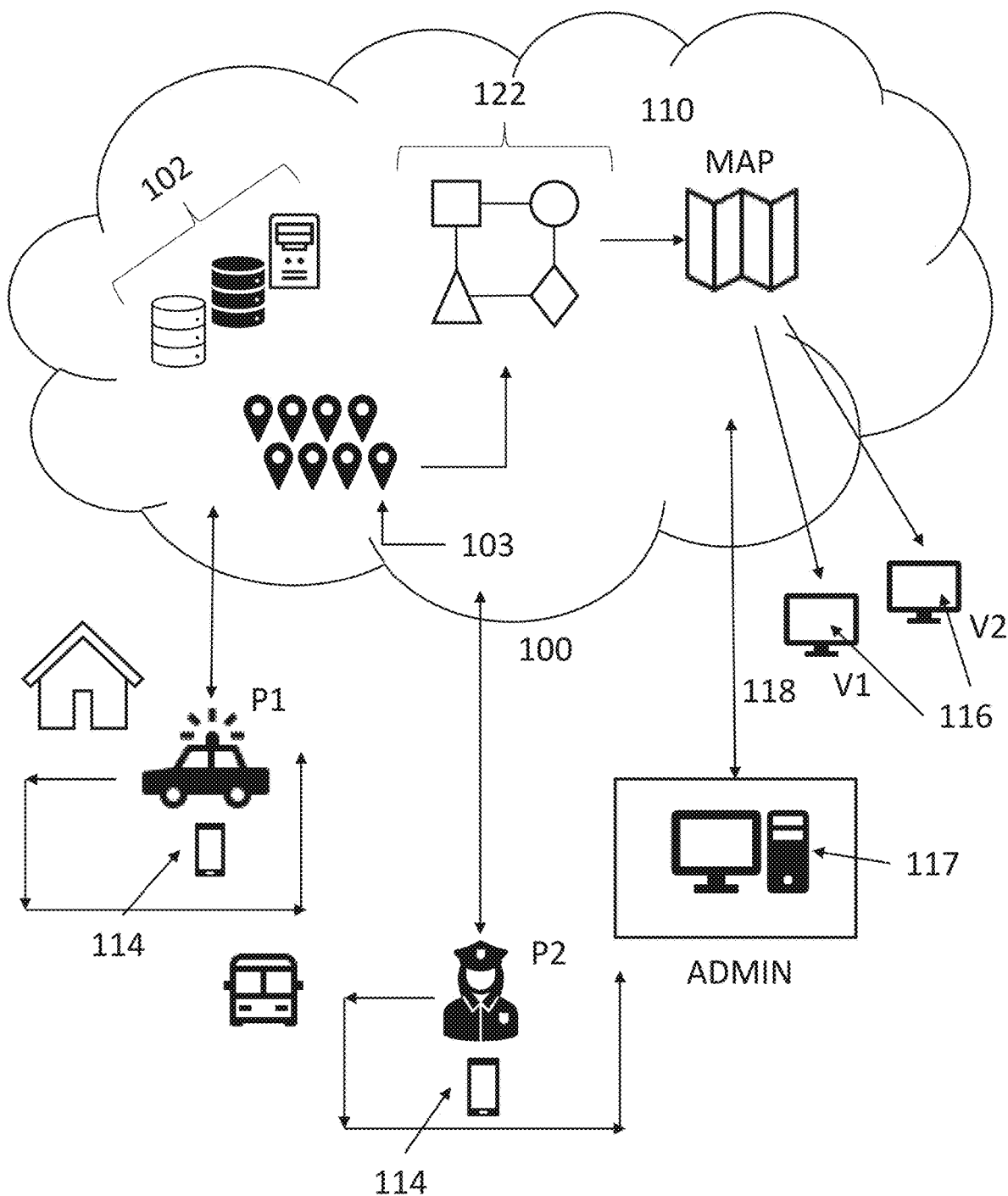
FIG. 1 depicts one example of schematic representation of a system in accordance with an aspect of the present invention.

In one or more aspects, a capability is provided for selectively managing patrols including sharing patrol information based upon GPS information related to mobile devices. The GPS information may include location coordinates including latitude, longitude and altitude, as well as time, obtained from a global positioning system. A patrol will be associated with and typically possess a trackable mobile device. As used herein a patrol includes a mobile device which is used to track the location of the device or an entity possessing the device which traverses a geographic area for the purposes of observation, reconnaissance and/or performance of a specified function. A patrol may include for example a police or other security patrol, a sanitation truck, a street sweeper, a snowplow, a traffic or parking patrol. The managing of patrols and sharing of patrol information is performed automatically via a computer system to designate a patrol point as being patrolled or unpatrolled during a patrol frequency time for a time prior to the expiration of a patrol beginning time, associated with each patrol point. The patrols utilize mobile objects/devices which include GPS capabilities. The devices obtain GPS information of their location; the GPS information includes geographic coordinates. This information is compared to the GPS coordinates of patrol points via a processor to determine if the mobile device is at or near the patrol point. If so, the processor designates the patrol point as being patrolled. Each patrol point may be assigned a patrol frequency (by, for example, an administrator) representing the period of time within which the location should be patrolled, for example every 24 hours. If a patrol point has been patrolled within or during its associated patrol frequency it is designated with a patrolled visual indicator on an electronic map. If not, it is designated with an unpatrolled visual indicator on the map. The map and all information relating to each patrol point is stored in a memory. The map is updated in real time as patrols occur such that at any period of time the map displays patrol points with either a patrolled visual indicator or an unpatrolled visual indicator. The map may be accessible and displayed to each patrol, administrators of the patrols, and other third parties such as the public, if desirable.

The map also includes real time information regarding the location of each patrol such that the movement of each patrol may be displayed visually on the map along with the patrol points and their patrol status e.g., patrolled, unpatrolled and/or to be patrolled within a specified time. The visual indicators of the patrol status may be designated colors. For example, a patrolled patrol point may be designated with the color green (or any other color) on the map, while an unpatrolled location designated with the color red (or any other color) on the map. Thus, the map displays in real-time all patrol points in either, for example, green or red depending on their status as patrolled or unpatrolled. These color visual indicators are updated in real time as the system determines if a patrol point has or has not been patrolled during its designated patrol frequency. Also, unpatrolled locations may be designated with different visual indicators including shapes and/or colors depending on the time remaining until their next patrol frequency expires. For example, if a patrol point is within 15 minutes of the expiration of its patrol frequency (and has not been patrolled during its patrol frequency), the unpatrolled location may be designated within a color yellow, for example. Thus, a patrol status may include patrol point being unpatrolled with a particular time, or set of times, prior to the expiration of its next patrol frequency.

Each patrol point is within a street segment, which is a portion of a street between two intersections. Each geographic zone in a map will contain street segments for each street segment therein, and each street segment will be associated with at least one patrol point which is designated in the system and associated with GPS coordinates (for example a single coordinate or a range of coordinates). In addition, attention points (other than patrol points designating street segments) may also be designated on the map and assigned a patrol frequency. These attention points may include specific other locations which should be patrolled such as buildings or parks, for example. The system will also monitor and upgrade the status of the attention points using GPS information from the patrols and compare the same with GPS coordinated associated with the attention points, similar to the patrol points as described above and herein, in real time.

In one aspect or example, the system includes two different types of components working together: 1) patrols and their associated mobile devices which collect and send GPS and other data; and 2) a processing entity such as an administrator processor which designates the components of a map of a geographic area and can view, manage, and assign patrol points and attention points as well as their associated patrol frequencies. Optionally, external third party devices may be allowed access to the map or certain portions of the map (such as the patrol points and their status as patrolled or unpatrolled).

The administration or processing entity may utilize, for example, a browser-based application that allows the administrator to manage the geographic map and each patrol point and attention point thereon (including each associated patrol frequency) and monitor devices within each patrol transmitting GPS and other data. This administrative device may be a computer, phone, or tablet and acts as a dispatch for the administrator.

The patrol mobile devices may be any device or set of devices that can capture and transmit GPS data and other telematic data including video data. One or more mobile devices collects GPS data, as well as additional device and environment data and sends that data to a server. The mobile devices may be cell phones, tablets, GPS hardware, cars, trucks, planes, boats, motorcycles, bicycles or any other device where a patrol's GPS can be tracked.

Aspects of this system or processes may be performed by a computer system including one or more processors in the mobile devices and/or processing entity, by one or more processors remote to the mobile devices and/or processing entity, or by a combination of processors in the mobile devices and/or processing entity and remote to the mobile devices. Many possibilities exist.

Referring to FIG. 1, aspects of a system 100 in accordance with an exemplary embodiment for selectively managing patrols is shown. A system 100 includes one or more processors, memory and/or servers 102 where data is transmitted and processed and wherein specific algorithms 122 are performed. In one example, the system may be implemented via cloud computing 110. The system receives or obtains GPS and other telematic data 103 from the patrol mobile devices 114. The GPS and other telematic data may be stored in memory associated with the processors 102.

A plurality of patrol mobile devices 114 are included as part of the system. These mobile devices may include automobiles, smart phones and other communication devices, mobile computers and tablets, flying objects such as airplanes, bicycles, buses, trucks, watercraft, horseback patrols, railway vehicles, foot patrols, motorcycles, and or segways, as well as any other object which is capable of movement in which may generate telematic information including GPS coordinates. The patrol mobile devices 114 in accordance with the system, share their GPS and other telematic information 103 which may be stored in the memory associated with the processors 102.

One or more processing entities 117 will function as an administrative processing entity or administrator capable of controlling and configuring the system 100. The mobile devices 114, processing entities 117 and third party devices 116 may be in communication with each other and/or connected via a cloud computing system 110. Alternatively or additionally, mobile devices 114, processing entities 117 and third party devices 116 may be connected to one or more central processors or decentralized processors and memory. Typical cloud computing system 110 includes various processors and memories 102 which are capable of receiving telematic information 103 including GPS information from each of the patrol mobile devices 114. Various algorithms 122 may be used in the cloud computing system 110 to process the GPS information and compare the same with other information stored or obtained by the system. The processing entity 117 is in communication with the cloud computing system 110 to transmit and/or receive instructions 118 to the various processors 102 in the cloud computing system. The cloud computing system 110 is capable of sharing the information relating to the patrol mobile devices 114 based upon the GPS data transmitted by the mobile devices 114 to the cloud computing system 110. The patrol mobile devices 114 may include location monitoring units embedded within a vehicle.

The system 110 monitors time and operates to record each time a patrol point or attention point is patrolled. The mobile devices and/or the processors within the system may record the time including all times when any patrol point and attention point has been patrolled. When the GPS coordinates of the patrol are within a predetermined distance from the GPS coordinates of patrol points or attention points, the system 110 will record the time when the patrol of such location occurred based upon information from the mobile devices. The system will then continue to monitor time and the location of patrols 114 to update the patrol status of the patrol points and attention points in real time. For example, based upon the system monitoring time, a patrol status of an attention point will change from for, example, "patrolled" to "two hours to patrol", and the visual indicators on the map and display will be changed by the system in real time. This system continuously monitors time as well as the patrol status configurations and patrol frequency times for each attention point and patrol point. The system continuously or continually calculates the time remaining until the current patrol frequency time expires, for each attention point and patrol point. The system compares the same to the various patrol statuses to update the map and display visual indicators corresponding to the current patrol status for each patrol point and attention point in real time. The system also stores in memory all patrol times for every attention point and patrol point, as well as each associated patrol status and visual indicators.

Figure 2:
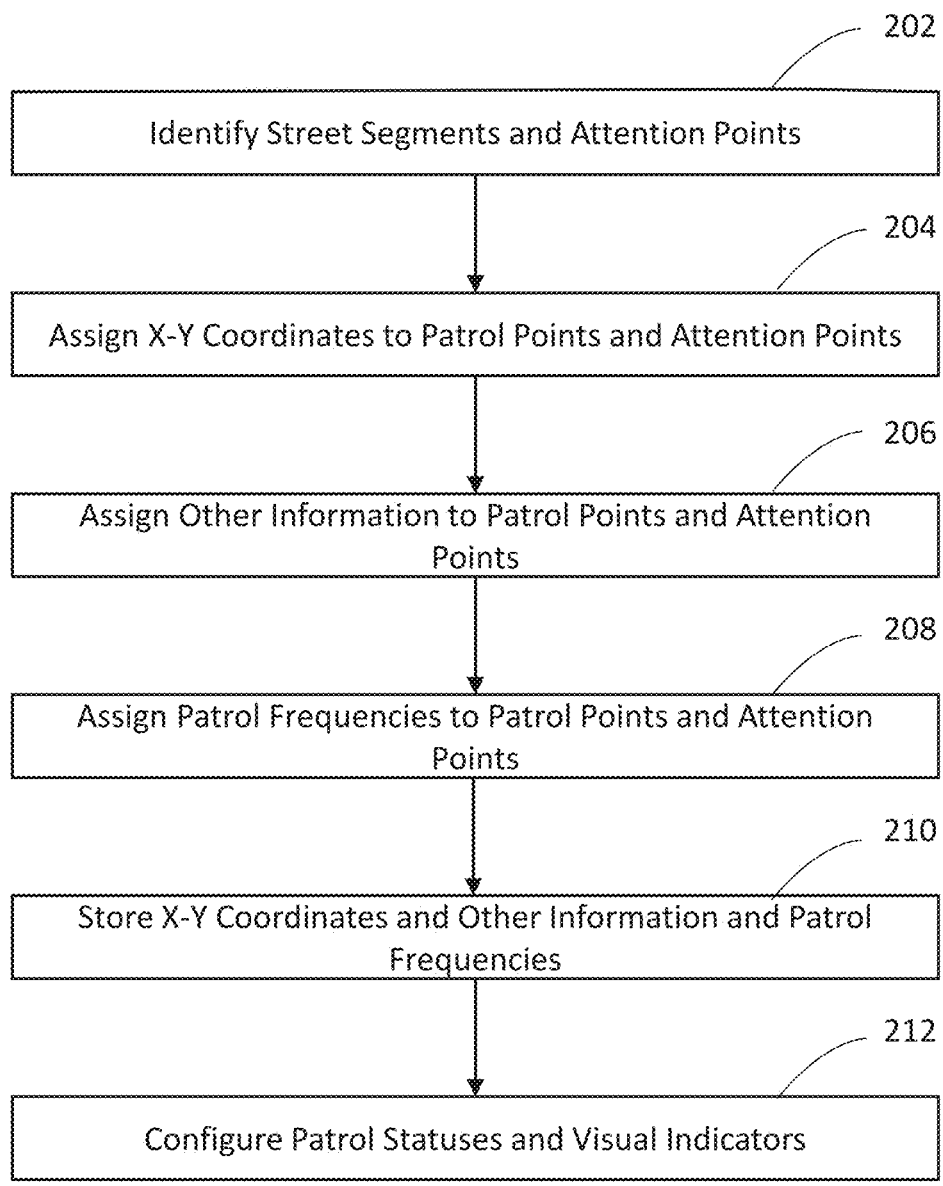
FIG. 2 depicts an example of a flow diagram of one aspect of performing the method using the system shown in FIG. 1.
Figure 3:
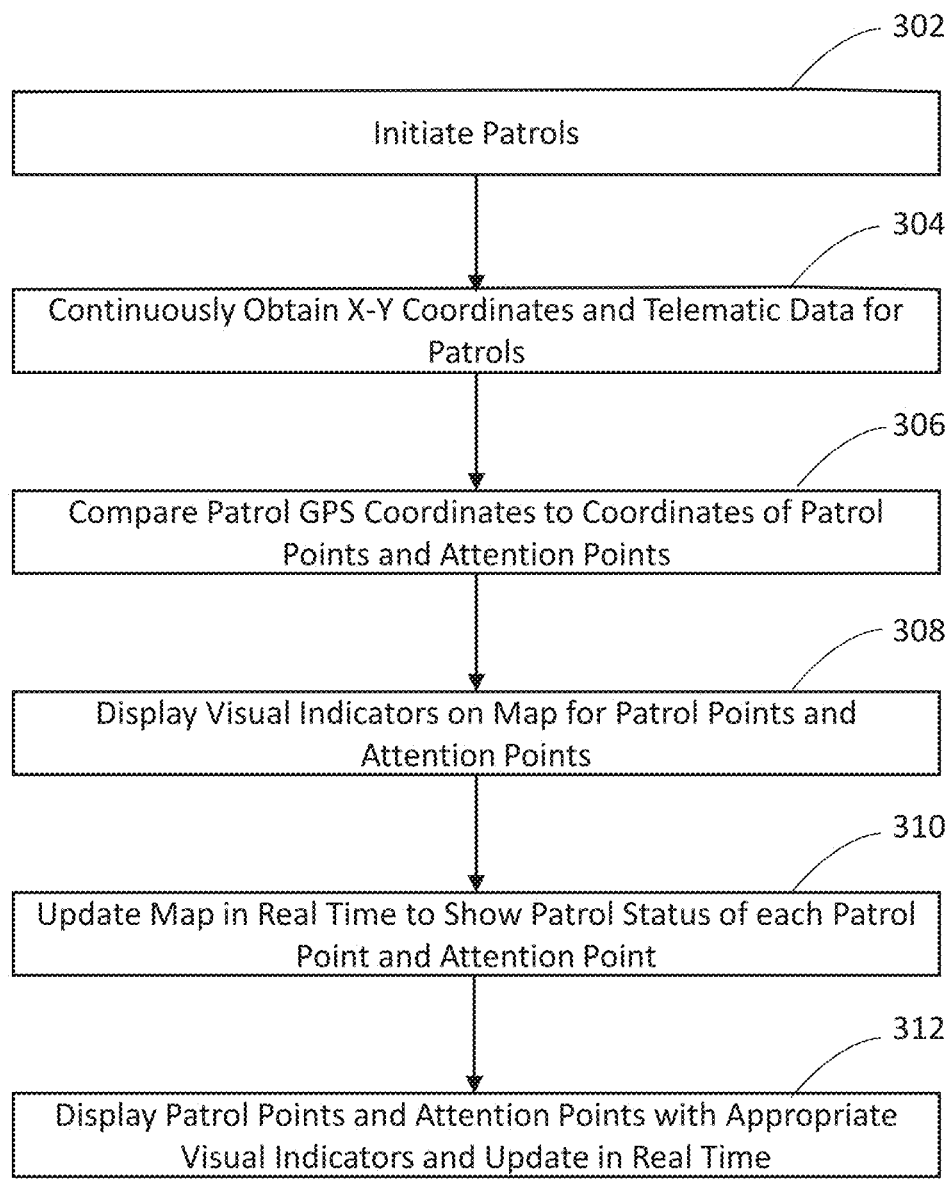
FIG. 3 depicts one example of a flow diagram of another aspect of performing the method using the system of FIG. 1.
Figure 4:
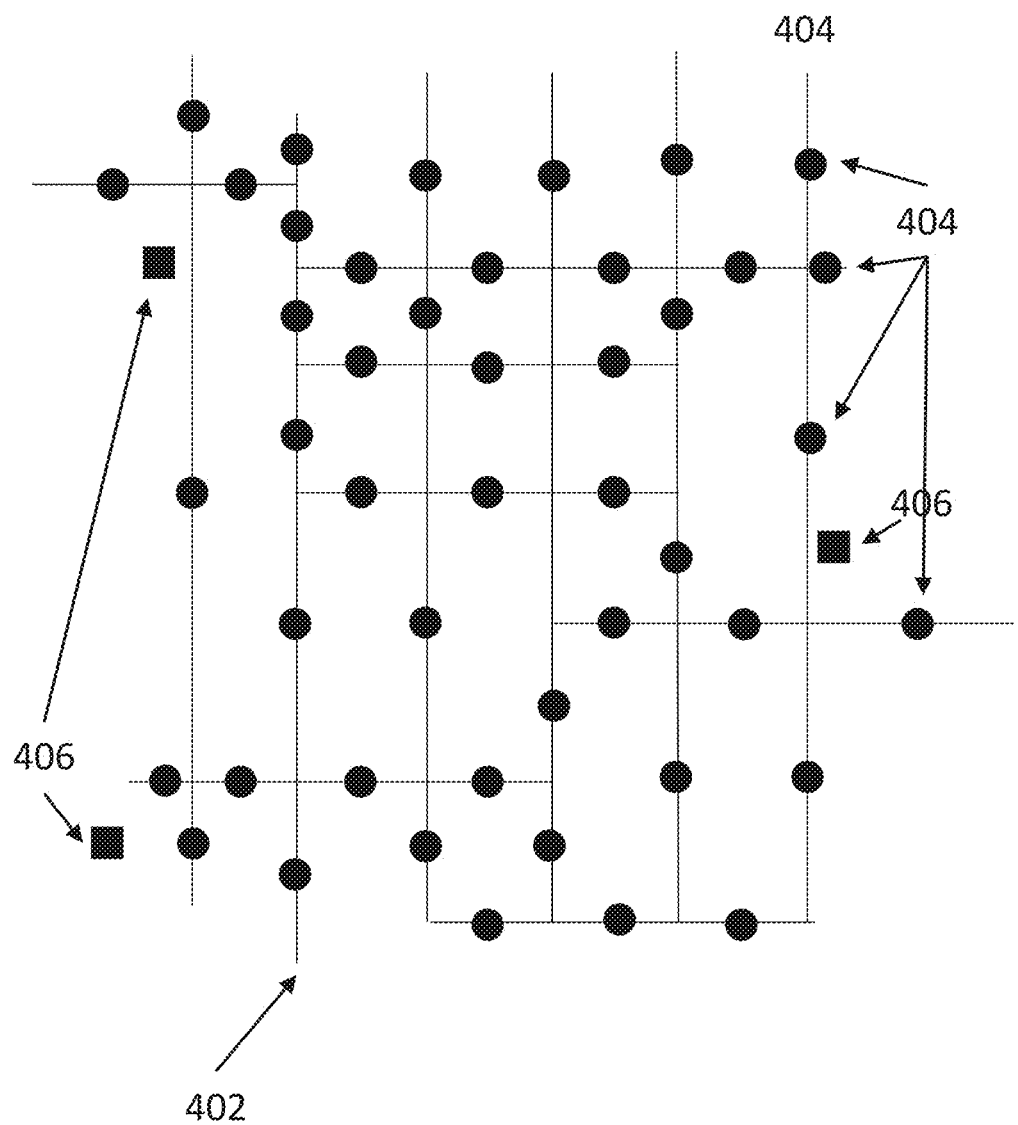
FIG. 4 depicts an example of an electronic map and a visual display thereof in accordance with one aspect of the present invention.

Referring now to FIG. 2-4, an example of the process steps for selectively managing patrols will be described in more detail. The process is performed using the system of FIG. 1, for example. Initially, the system is configured by identifying street segments and attention points on an electronic map, in step 202. Then in step 204, GPS coordinates are assigned to patrol points for each of the street segments and each of the attention points. Next, in step 206, other information for patrol points and attention points may be assigned and associated with the patrol and attention points. The information or data stored and associated for an attention point and or patrol point may include any type of data or information of interest. The system may be configured by the administrator to store such different types of information. For example, the information may include persons associated with such locations, dates, times and events which have or may have occurred at such locations, typical traffic conditions at various times for such locations, prior information from earlier patrols for such locations including historical information or summaries from prior patrols. This information may include various different visual indicators and other data relevant to the specific patrol points and attention points. For example, the information may include various types of metadata associated with the patrol points and attention points. Also, attention points can be created through an integration with a third-party system. Data, including location, crime or prior incident information, name and additional meta data about attention points may automatically be imported into the system and available via a display or other interface for the administrator and patrols to use. Furthermore, actions or tasks to be undertaken or considered for attention points can be created and assigned to each attention points by the administrator. Based upon the criteria and conditions a prescriptive or randomized action can be set for any attention point wherein the system instructs or informs the patrol of actions which should be performed when the patrol arrives at the attention point. For example, the action may be to drive by the attention point, physically visit the location by entering a building, turn flashing lights on, and/or drive the perimeter of the location. The list of these patrol actions can be defined by the administrator.

In step 208, patrol frequencies for each patrol point and attention point are assigned into the system. And, in step 210 the system receives and stores GPS data, as well as any other data including patrol frequencies for each of the patrol points and attention points. The data is stored within the system's processors, memory and/or servers 102 as shown in FIG. 1. The aforementioned steps are used to initialize the system and may be performed by the administrator 117 and the system. For example, in step 212, patrol status and patrol status visual indicators are defined and initialized by the administrator. The patrol status and patrol status visual indicators are defined and initialized for each patrol point and attention point by the administrator 117. The steps need not be performed in the order shown in FIG. 2.

The system may be configured by the administrator in various different ways. A patrol status may be defined in various different ways including when a location has been patrolled, should be patrolled, and the time since a prior patrol frequency expired, and/or patrol frequency time will expire. A patrol status may represent patrol points which have not been patrolled prior to the time its latest prior patrol frequency expired, for example, an "unpatrolled" patrol status. In addition, a patrol status may represent patrol points which have been patrolled during their assigned associated patrol frequency, for example, a "patrolled" patrol status. A patrol status may also be defined to represent patrol points which have not been patrolled within at least a predetermined time prior to the next time their associated patrol frequency will expire. A patrol status may be defined as a situation where a patrol point has not been patrolled during its current patrol frequency but is within a first predetermined time prior to the expiration of its current patrol frequency, for example, 15 minutes prior to the expiration of its current or next patrol frequency. In this situation, for example, if a patrol point has not been patrolled during its current patrol frequency but it is within 15 minutes left prior to its patrol frequency expiring, then its patrol status is or may be defined as "15 minutes to patrol."

In addition, a particular patrol status may be defined as a patrol point and or attention point which has been unpatrolled within at least a second predetermined time prior to the next time their associated patrol frequency will expire. For example, the first predetermined time period may be 15 minutes and the second time period 2 hours. In this situation, the visual indicators may be defined differently for each time period. For example, a patrol point which has 15 minutes left prior to its patrol frequency expiring and which has not been patrolled during its current patrol frequency maybe associated with a yellow-colored visual indicator and a specific shaped visual indicator. Also, for example, a patrol point which has 2 hours left prior to its patrol frequency expiring and which has not been patrolled during its current patrol frequency maybe associated with a pink color and other different visual indicators such as a specific shaped visual indicator. The visual indicators will be displayed on a map by the system so that users such as third parties 116, administrators 117, or patrols 114, may view the map on a display device and visually recognize the patrol status of each patrol point and attention point on the map based on the visual indicators, e.g., shapes and colors, at the attention points and patrol points.

In addition, the map may be defined by the administrator to have multiple geographic zones within an area. Each geographic zone or area may be associated with different patrols and/or different patrol criteria (patrol frequencies and/or patrol statuses) for the patrol points and attention points within each geographic area or zone.

Referring now to FIG. 3, operation and implementation of the system with respect to managing patrols will now be described. These steps may be performed by the administrator and/or the system. In step 302, patrols may be dispatched. Each patrol may cover and traverse areas on the geographic map and area. In step 304, for each patrol, the system obtains GPS coordinates and telematic data for the locations of each patrol continuously and in real time. In step 306, the system compares the GPS coordinates obtained for the patrols in step 304 with coordinates stored in the system for each individual patrol point and attention point. The system is configured to associate the attention point and patrol point as patrolled when the GPS coordinates of the patrol fall within a predetermined distance from the GPS coordinates of the patrol points and attention points within the map. Thus, the system determines when an attention point or patrol point has been patrolled when a patrol's GPS coordinates are within a predefined distance from the GPS coordinates assigned to the patrol point or attention point and its associated street segment or geographic location. A patrol point or attention point which has been patrolled within its associated time frequency will be designated with a patrol status of "patrolled." A patrol point or attention point which is not been patrolled within its patrol frequency will be designated with a patrol status of "unpatrolled." A visual indicator of a "patrolled" status will be different than a visual indicator of an "unpatrolled" status and shown on the geographic map so that patrolled status visual indicators will appear different than unpatrolled status visual indicators. Thus administrators, patrols and third parties capable of viewing the map will be able to distinguish between patrolled and unpatrolled attention points and patrol points.

In step 308, the map displays visual indicators of all attention points and patrol points. In step 310, as time progresses the map is updated in real time to show the patrol status for all attention points and patrol points using the corresponding visual indicator. In step 312, the visual indicators of each patrol status for each patrol point and attention point are updated and displayed on the displays of the administrator based upon changes in patrol status for each patrol point and attention point. The patrol status is shown on the map using visual indicators (e.g., colors and shapes) associated with a particular patrol status. Steps 310 and 312 may occur simultaneously.

In FIG. 4, an electronic map 402 of a geographic area in accordance with aspects of the invention as shown. The map 402 is stored electronically in memory within the system 100. The map includes a plurality of street segments; one or more, or all of the street segments may be associated with patrol points 404. Accordingly, multiple patrol points associated with different street segments are stored with the electronic map and are displayed visually on the display devices 116, 117, 114 (shown in FIG. 1). In addition to patrol points, attention points 406 may also be defined in the electronic map, as shown in FIG. 4. For example, within a street segment there may be an attention point such as a school or a particular business, for which a patrol frequency is assigned to enable a separate and consistent patrol thereof. And, the attention points may be shown with the different visual indicators. For example, attention points in FIG. 4 are shown using rectangles while patrol points are shown using circles. In accordance with the system, each patrol point and attention point is assigned a patrol frequency, namely, a period of time for which patrol should occur. For example, a patrol frequency of 24 hours means that the patrol point or attention point with such an associated patrol frequency should be patrolled every 24 hours. A patrol point with such a patrol frequency which has not been patrolled within the last 24 hours will be designated by the system as "unpatrolled" and represented on the map shown in FIG. 4 using a visual indicator representing an unpatrolled status. Conversely a patrol point and attention point which has been patrolled within the last 24 hours will be designated as having a "patrolled" patrol status by the system and visual indicators representing such patrolled statuses will be shown on the map.

Figure 5:
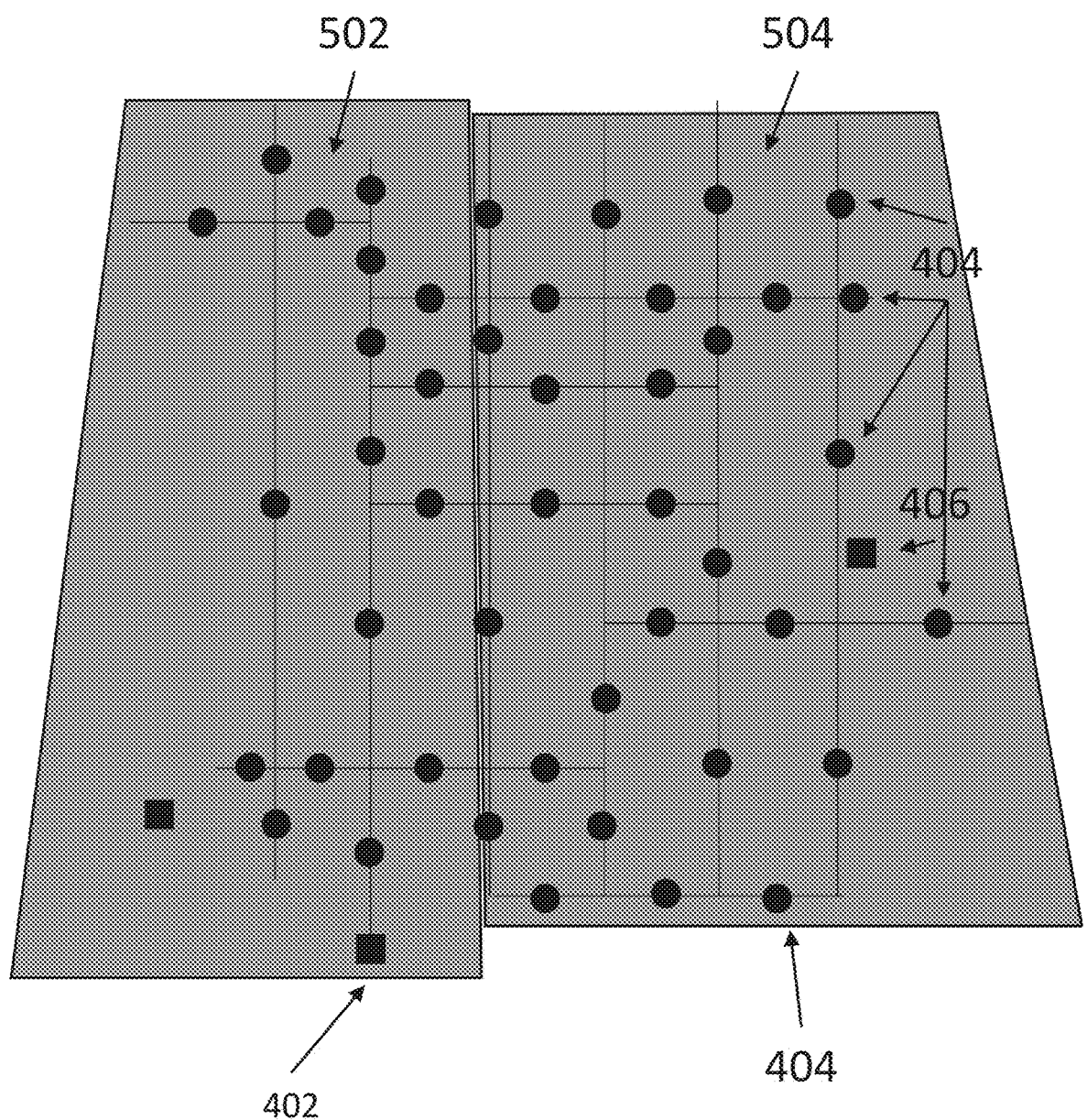
FIG. 5 depicts the map of FIG. 4 divided into zones in accordance with an aspect of the present invention.

Referring to FIG. 5, the map 402 maybe divided in two different geographic zones or subareas 502, 504. Each of the zones 502, 504 can be used to identify a set of streets with associated patrol points and attention points. The patrol points may be assigned to a patrol and/or an associated mobile object within a patrol or to a particular set of mobile objects within a patrol group. For example, patrol P1 (shown in FIG. 1) may be responsible for patrolling zone 502, while patrol P2 (shown in FIG. 1) is responsible for patrolling zone 504. These zones can be viewed on the mobile device and associated displays and configured by the administrator (as shown in FIG. 1).

Figure 6:
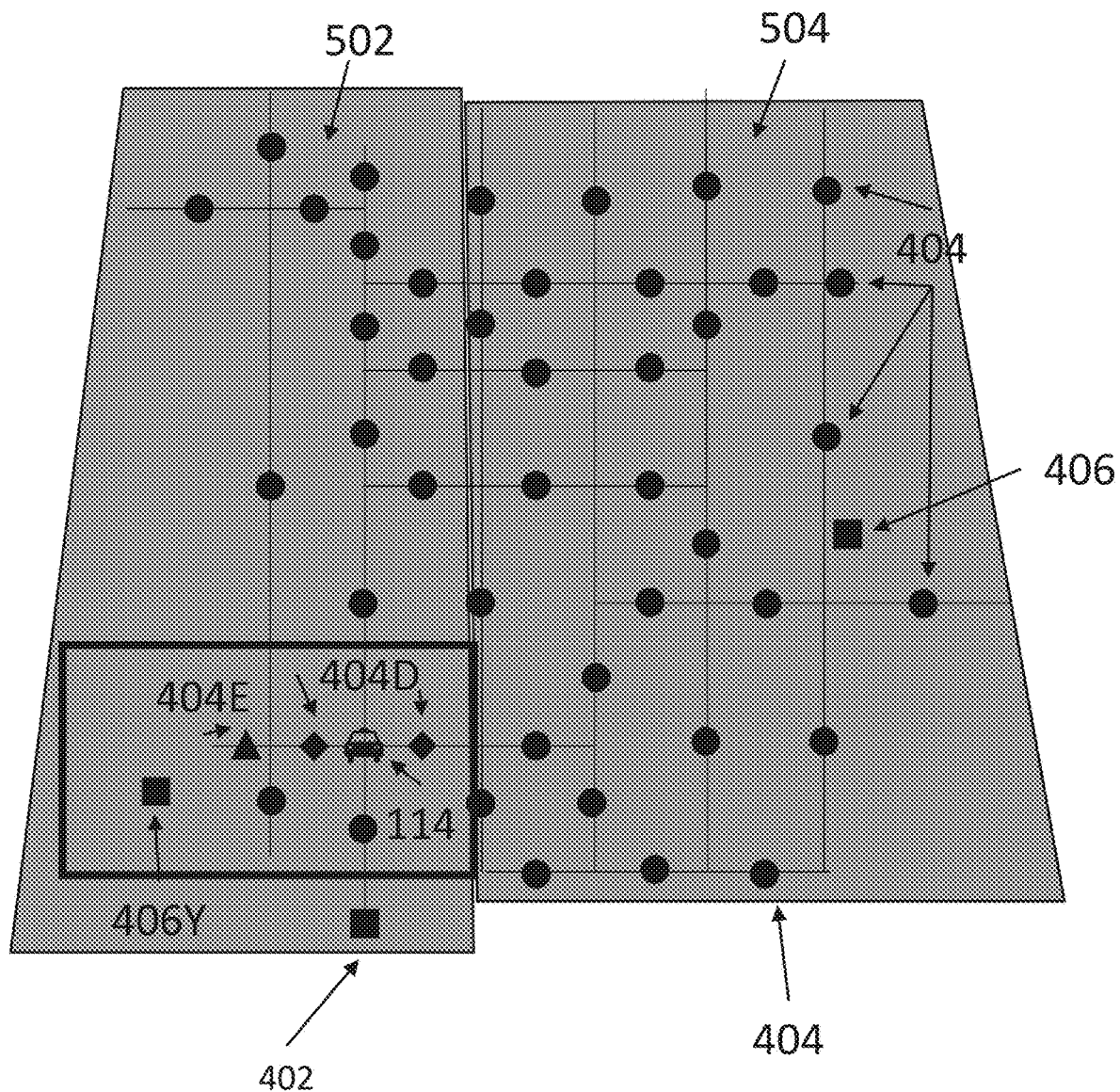
FIG. 6 depicts the map of FIGS. 4 and 5 depicting a patrol moving therein within various patrol points and attention point in accordance with an aspect of the present invention.

Referring now to FIG. 6, within the map 402 patrol points 404, attention points 406 and patrol 114 is also shown. Patrol points include locations 404D and 404E. Also, attention points include attention point 406Y. The system has been configured to have at least five different patrol statuses; 1) a first patrol status corresponding to "patrolled"; 2). a second patrol status corresponding to "patrol in four hours" representing a status where an unpatrolled attention point or patrol point has four hours left prior to its current patrol frequency expiring; 3) a third patrol status corresponding to "patrol in two hours" representing a status where an unpatrolled attention point or patrol point has two hours left prior to its current patrol frequency expiring; 4) a fourth patrol status corresponding to "patrol in one hour" representing a status where an unpatrolled attention point or patrol point has one hour left prior to its current patrol frequency expiring, and 5), a fifth patrol status corresponding to "patrol in 15 minutes" representing a status where an attention point or patrol point has 15 minutes left prior to its current patrol frequency expiring.

In FIG. 6, patrol point 404D has not been patrolled during its current patrol frequency, which will expire within 15 minutes, and thus is displayed with a visual indicator corresponding to this patrol status. Patrol point 404E has not been patrolled within an hour prior to its current patrol frequency expiring, and is thus displayed with a visual indicator corresponding to this patrol status. The system has been configured, so that all other patrol points 404 may be designated as having the same or different patrol frequency, patrol statuses as well as the same or different visual indictors of patrol statuses. The system has also been configured, for example, by the administrator, such that the each of the five different patrol statuses are displayed using a different visual indicators, including a geographic shapes and colors. Patrol points and attention points which have a patrol status of within "1 hour to patrol", e.g., patrol point 404E and attention point 406Y, are displayed using even further different visual indicators such as a triangle (for a patrol point) or rectangle (for an attention point), and a different color, for example, pink. Thus, when patrol point 404D or attention point 406Y have been unpatrolled and are within 15 minutes of their next expiring patrol frequency 117, they will be displayed on map 402 in a diamond shape or rectangle, respectively, and in the color as red. However, patrol point 404E, when it is within one hour of its expiration of its patrol frequency, and has yet to be patrolled during its current patrol frequency, will be shown in a triangle shape on map 402 and in a pink color. All other patrol points which are designated with a patrol status of "patrolled" are shown on the map using different visual indicators, namely, green circles. However, the system may be configured to use different visual indicators for each different patrol status. And, the system may be configured by the administrator to accommodate different patrol statuses (as defined by administrators). The system is configured to operate to continuously update map 402 which is stored electronically in memory and is continuously or periodically displayed on various display devices 116, 117, 114.

Figure 7:
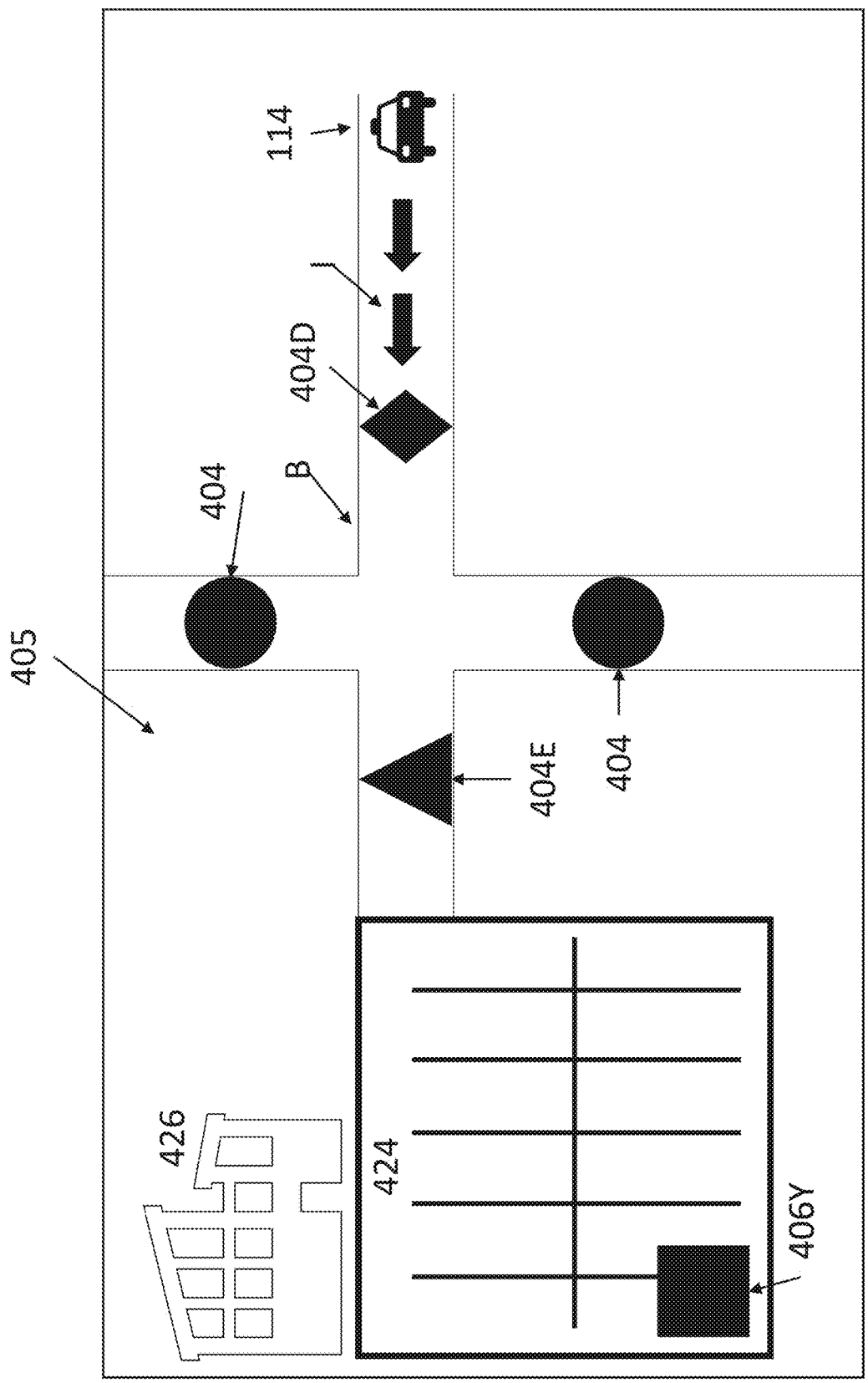
FIG. 7 depicts a particular section of the map of FIGS. 4-6 in accordance with an aspect of the present invention.

Referring now to FIG. 7, a specific area 405 in map 402 is shown. A patrol 114 with a mobile device traversing streets along path I with associated patrol points 404 and associated attention point 406 are displayed on the map in area 405. The patrol points include patrol points 404, 404D and 404E; each patrol point is associated with a particular street segment located on one or more streets. The system has been configured to include an attention point 406Y. attention point 406Y may be associated with a particular building such as a school 426 adjacent a parking lot 424. The system has been configured so that each patrol frequency for each attention point and each patrol point is 24 hours. Within the map, a patrol 114 having a mobile device which transmits GPS coordinates and other telematic information through the system so as to track its current location over time is shown.

The patrol status of patrol points are shown on the map using particular visual indicators. Patrol points 404 show a visual indicator of a green circle, which represent a status of "patrolled". Thus, each patrol point location which has a "patrolled" patrol status is shown using such the visual indicator of a green circle. In addition, locations with a patrol status of "patrol in 15 minutes" are displayed with a red diamond shaped visual indicator. In addition, the patrol points, namely, point 404E with a patrol status of "two hours to patrol" is shown in a pink triangle. Accordingly, as shown in FIGS. 6 and 7, the display of the electronic map shows a map with streets within a geographic area and patrol points 404 shown in green dots on the map, while patrol point 404E whose status is "two hours to patrol" is shown using a pink triangle, while patrol point 404D whose patrol status is "15 minutes to patrol" is shown using a red diamond. Finally, attention point 406Y having an unpatrolled status of "one hour to patrol" and is shown with an associated visual indicator corresponding to a red rectangle.

Figure 8:
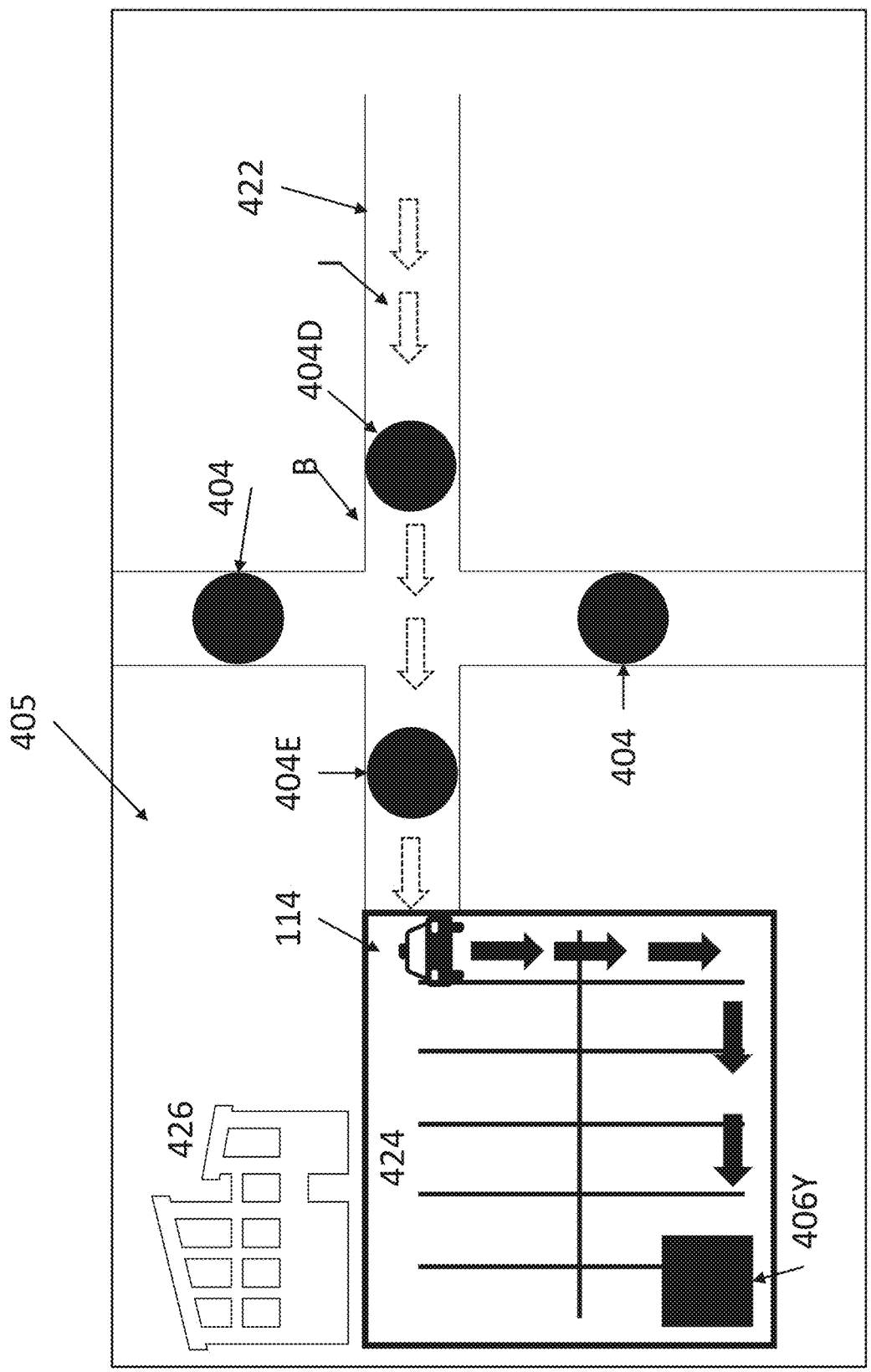
FIG. 8 depicts the section of the map in FIG. 7 after a patrol has patrolled patrol points in accordance with an aspect of the present invention.

Referring now to FIG. 8, patrol 114 has driven on street 422 past patrol point 404D and past patrol point 404E. The system compares the GPS coordinates of patrol 114 to the GPS coordinates of all attention points including 404D and 404E continuously. When patrol 114 passed within a certain distance of patrol point 404D, the system updated the patrol status of patrol point 404D to "patrolled". Similarly, the system updated the patrol status of patrol point 404E as "patrolled" at the same time that patrol 114 passed near patrol point 404E. The system continuously monitors the position of patrol 114 to compare its position with the stored GPS locations for each patrol point. In addition, the system updated map 402 continuously and in real time to change the patrol status of patrol points 404D and 404E to "patrolled". As shown in FIG. 8, patrol 114 passes patrol point locations 404D and 404E and enters parking lot 424. At this time, the system continuously receives GPS data from the mobile device within patrol 144.

Figure 9:
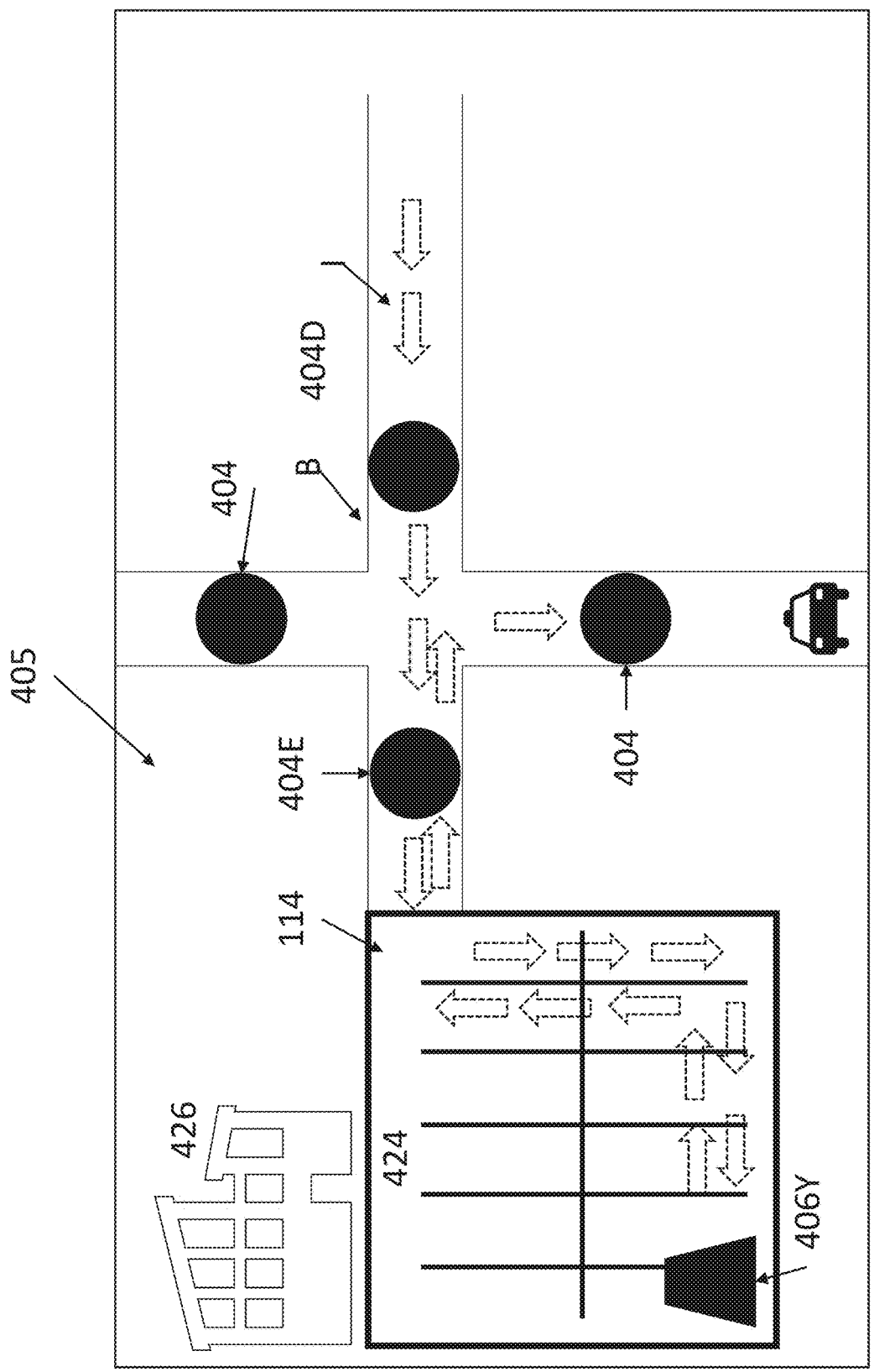
FIG. 9 depicts the section of the map in FIGS. 7 and 8, after a patrol has patrolled an attention point in accordance with an aspect of the present invention.

As shown in FIG. 9, patrol 114 has traversed parking lot 424 and was within a particular distance of attention point 406Y. The system compared the GPS coordinates between attention point 406Y and patrol 114 and determined that attention point 406Y has been patrolled. The system has then updated the patrol status of attention point 406Y to "patrolled". Accordingly, as shown in FIG. 9, and patrol points 404D, and 404E are shown on the visual display of the map as having a "patrolled" patrol status and thus are shown with a green circle visual indicator. In addition, attention point 406Y is shown having a "patrolled" status using a visual indicator of a green parallelogram.

The system is configured to determine when a patrol point or attention point has been patrolled by comparing the GPS coordinates of the patrol to the GPS coordinates of the attention point and patrol points. In order to determine when a location has been patrolled the administrator may configure the system to associate a distance with the attention points and patrol points. The distance may be a particular radius from each location. For example, a location may be associated with a radius of 10 yards and if the patrol passes within 10 yards of the location (as determined by comparing the GPS coordinates) then the system recognizes the location as patrolled.

The system records the time and date of each patrol of the patrol point and attention point. The system continuously updates this information in real time and builds a database of a patrol history for each patrol point and attention point. The database is stored in memory and may be accessed by, for example the administrator to perform data analysis. In addition, the system may be configured to record information relating to incidents which have occurred at each patrol point and attention point. The information relating to such incidents may be input into the system directly by the patrol via their mobile device, for example, or by the administrator. In addition to the system being used to manage patrols in real time, as previously described, the system may be used to record and share information based upon historical data.

When operating using real time data, the system may be used by users who are responsible for monitoring the locations of patrols devices, including a fleet of vehicles such as police vehicles, foot patrol officers, sanitation workers, plow drivers or the like.

As time progresses, the system will change the visual indicators of a patrol points and attention points based upon a change in their patrol status. For example, when an attention point or patrol point location has not been patrolled during its current patrol frequency but the time left to patrol reaches the first predetermined time, e.g., 15 minutes to patrol, its patrol status has changed and the system will change the visual indicators on the map displaying the attention points and patrol points with their updated patrol status.

In addition, the system may store patrol data for each patrol point and attention point as historical data accumulated over time and stored in the system or remotely. The historical patrol data can be used to perform data analytics or mobile objects and planned travel routes.

One example of a computer system that includes processors that may be used by one or more aspects of the present invention is described with reference to FIG. 10. In this example, the computer system is part of a computing environment including additional components that may or may not be used by aspects of the present invention.

Figure 10:
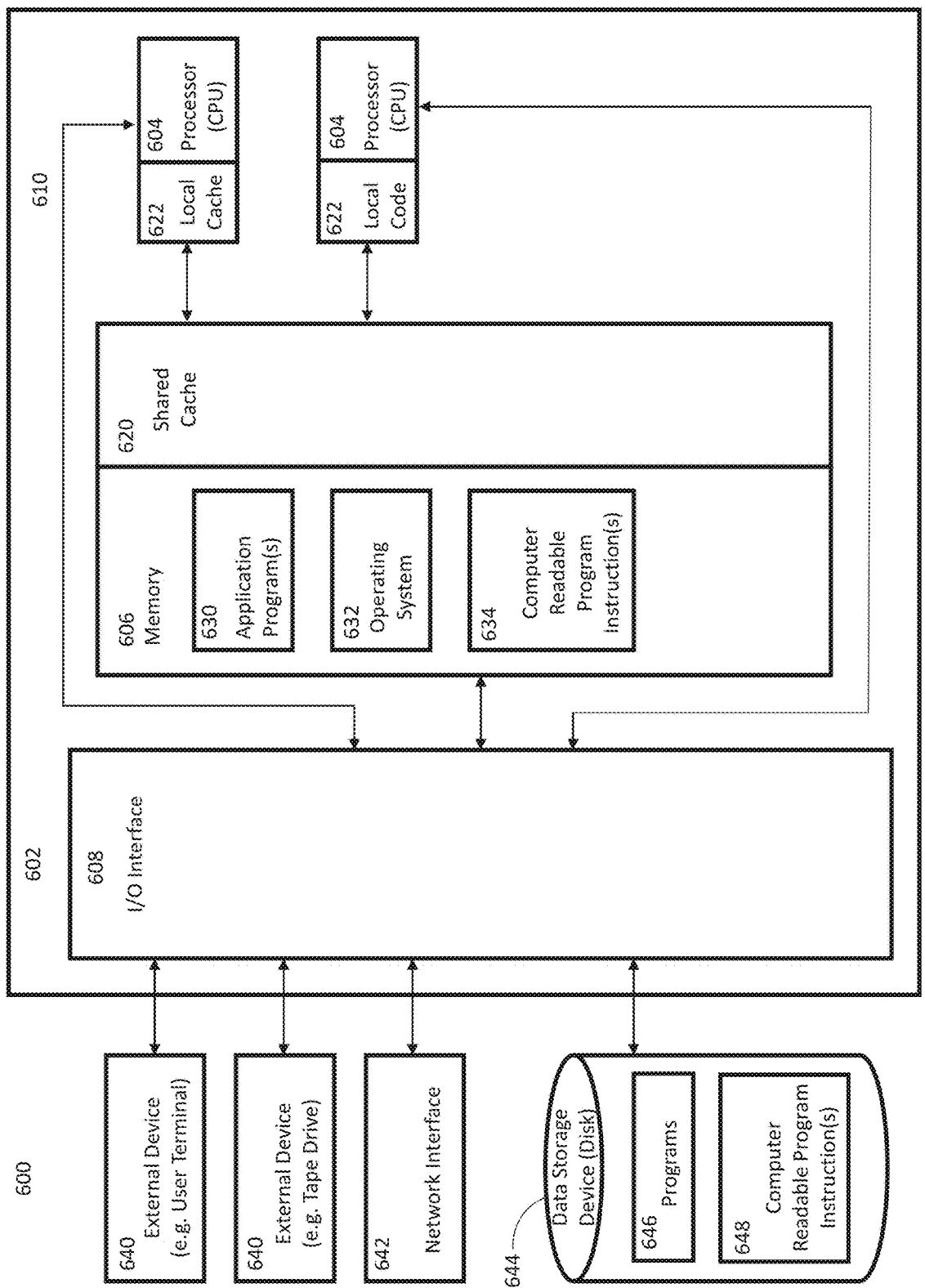
FIG. 10 depicts one example of a computing environment which may be used to incorporate and perform one or more aspects of the present invention.

As shown in FIG. 10, a computing environment 600 useable to perform the process of this invention and as part of a system to facilitate the invention is disclosed. The computing environment may include multiple processors and memory including those present in the mobile devices, processing entity and/or third party devices, or a more centralized system. The computing environment includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 620, such as a shared cache, which may be coupled to local caches 622 of processors 604. Further, memory 606 may include one or more programs or applications 630, an operating system 632, and one or more computer readable program instructions 634. Computer readable program instructions 634 may be configured to carry out functions of embodiments of aspects of the invention.

Computer system 602 may also communicate via, e.g., I/O interfaces 608 with one or more external devices 640, one or more network interfaces 642, and/or one or more data storage devices 644. Example external devices include a user terminal, a tape drive, a pointing device, a display, etc. Network interface 642 enables computer system 602 to communicate with one or more networks, such as a local area network (LAN), a general wide area network (WAN), and/or a public network (e.g., the Internet), providing communication with other computer devices or systems. For example, the system may be connected to a personal computer, tablet device or smartphone to communicate the assigned or unassigned status of mobile objects to user via a graphical user interface.

Data storage device 644 may store one or more programs 646, one or more computer readable program instructions 648, and/or data, etc. The computer readable program instructions may be configured to carry out functions of embodiments of aspects of the invention.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors and/or other aspects of the computer system or computing environment may be remote from the mobile devices. Further, in one particular example, a processor, such as processor 604, may execute, in accordance with one or more aspects of the present invention, one or more machine learning engines and/or other engines to provide, based on training and learning, based upon telematic information of the mobile devices. These engines may be stored in memory, including main memory and/or one or more caches, and/or external storage, and may be executed on one or more processors. Many variations exist.

One or more aspects of the present invention are inextricably tied to computer technology and/or to the improvement of a technical field.

One or more aspects may relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages such as Angular, HTML, CSS, .NET Framework, C# and Microsoft SQL Server, and including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of mobile devices, third party devices, processing entities may be used, as well as other types of neural networks and/or evolutionary algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The invention claimed is:

1. A computer implemented method of managing patrol points comprising:
   recording, in a digital memory, GPS information relating to patrol points associated with street segments of a geographic area;
   for said patrol points, recording in a digital memory, at least one patrol frequency time, wherein each patrol point is associated with at least one patrol frequency time;
   obtaining, via at least one processor, GPS location information relating to the location of at least one patrol;
   determining, via the at least one processor, when patrol points have been patrolled by comparing the GPS location information of the patrol points to the GPS location information of the at least one patrol;
   displaying, via a processor, the patrol points and streets on a map of the geographic zone via at least one display device;
   determining, via the at least one processor, a patrol status for patrol points based upon the determining when patrol points have been patrolled and time;
   displaying on the map visual indicators of the patrol status for patrol points; and
   automatically updating said map, via a processor, in real-time by changing the visual indicators for patrol points based upon their patrol status.

2. The method of claim 1 and wherein the patrol status comprises patrol points which have been patrolled and patrol points which have not been patrolled during their patrol frequency time.

3. The method of claim 2 wherein the patrol status further comprises (i) patrol points which have not been patrolled within at least a first predetermined time and/or second predetermined time prior to a next time that their patrol frequency time expires and/or (ii) patrol points which have not been patrolled since a time after their last patrol frequency time expired.

4. The method of claim 3 wherein the visual indicators for patrolled point locations are different based upon their patrol status and are displayed differently on said map.

5. The method of claim 4 wherein patrol frequencies are different for a portion of the patrol points.

6. The method of claim 5 wherein each patrol point is associated with additional stored data.

7. The method of claim 2 further comprising recording, in said digital memory, attention points in the geographic area and displaying the attention points on the map.

8. The method of claim 7 wherein each attention point is associated with a patrol frequency and displaying, via a processor, patrolled visual indicators on the map for each attention point based upon a patrol status for the attention points.

9. The method of claim 8 wherein visual indicators for each attention point are automatically updated in real time based upon whether the attention point has been patrolled during its associated patrol frequency time.

10. The method of claim 3 further comprising displaying on the map, via a processor, the locations of the at least one patrol in real time.

11. A computer system for managing patrol points comprising:
at least one digital memory, and
one or more processors in communication with the digital memory, wherein the computer system is configured to perform a method, the method comprising:
recording, in a digital memory, GPS information relating to patrol points associated with street segments of a geographic area;
for said patrol points, recording in a digital memory, at least one patrol frequency time, wherein each patrol point is associated with at least one patrol frequency time;
obtaining, via at least one processor, GPS location information relating to the location of at least one patrol;
determining, via the at least one processor, when patrol points have been patrolled by comparing the GPS location information of the patrol points to the GPS location information of the at least one patrol;
displaying, via a processor, the patrol points and streets on a map of the geographic zone via at least one display device;
determining, via the at least one processor, a patrol status for patrol points based upon the determining when patrol points have been patrolled and time;
displaying on the map visual indicators of the patrol status for patrol points; and
automatically updating said map, via a processor, in real-time by changing the visual indicators for patrol points based upon their patrol status.

12. The system of claim 11 wherein the patrol status comprises patrol points which have been patrolled and patrol points which have not been patrolled during their patrol frequency time.

13. The system of claim 12 wherein the patrol status further comprises (i) patrol points which have not been patrolled within at least a first predetermined time and/or second predetermined time prior to a next time that their patrol frequency time expires and/or (ii) patrol points which have not been patrolled since a time after their last patrol frequency time expired.

14. The system of claim 13 wherein the visual indicators for patrolled point locations are different based upon their patrol status and are displayed differently on said map.

15. The system of claim 14 wherein patrol frequencies are different for a portion of the patrol points.

16. The system of claim 13 wherein each patrol point is associated with additional stored data.

17. The system of claim 13 further comprising recording, in at least one digital memory attention points in the geographic zone and displaying the attention points on the map.

18. The system of claim 17 wherein each attention point is associated with a patrol frequency and displaying, via the one or more processors, patrolled visual indicators on the map for each attention point which has been patrolled during its associated patrol frequency time.

19. The system of claim 18 wherein visual indicators for each attention point are automatically updated is real time based upon whether the attention point has been patrolled during its associated patrol frequency time.

20. The system of claim 12 wherein the one or more processors display on the map the locations of the at least one patrol in real time.

21. A computer program product for managing patrol points comprising:
at least one computer readable storage medium readable by a processing circuit for performing a method, the method comprising:
recording, in a digital memory, GPS information relating to patrol points associated with street segments of a geographic area;
for said patrol points, recording in a digital memory, at least one patrol frequency time, wherein each patrol point is associated with at least one patrol frequency time;
obtaining, via at least one processor, GPS location information relating to the location of at least one patrol;
determining, via the at least one processor, when patrol points have been patrolled by comparing the GPS location information of the patrol points to the GPS location information of the at least one patrol;
displaying, via a processor, the patrol points and streets on a map of the geographic zone via at least one display device;
determining, via the at least one processor, a patrol status for patrol points based upon the determining when patrol points have been patrolled and time;
displaying on the map visual indicators of the patrol status for patrol points; and
automatically updating said map, via a processor, in real-time by changing the visual indicators for patrol points based upon their patrol status.

22. The computer program product of claim 21 wherein the patrol status comprises patrol points which have been patrolled and patrol points which have not been patrolled during their patrol frequency time.

23. The computer program product of claim 22 wherein the patrol status further comprises (i) patrol points which have not been patrolled within at least a first predetermined time and/or second predetermined time prior to a next time that their patrol frequency time expires and/or (ii) patrol points which have not been patrolled since a time after their last patrol frequency time expired.

24. The computer program product of claim 23 wherein the visual indicators for patrolled point locations are different based upon their patrol status and are displayed differently on said map.

25. The computer program product of claim 21 wherein each patrol point is associated with additional stored data.

26. The computer program product of claim 21 wherein visual indicators for each attention point are automatically updated is real time based upon whether the attention point has been patrolled during its associated patrol frequency time.

27. The computer program product of claim 23 wherein the processing circuit displays on the map, via the one or more processors, the locations of the at least one patrol in real time.

* * * * *